Sept. 11, 1934.  W. W. COWGILL  1,973,614
PECTIN
Filed April 28, 1934
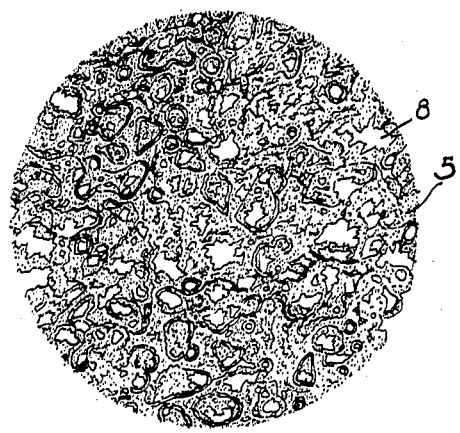
Fig.1.
Fig.2.
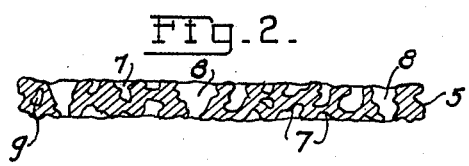
Fig.3.
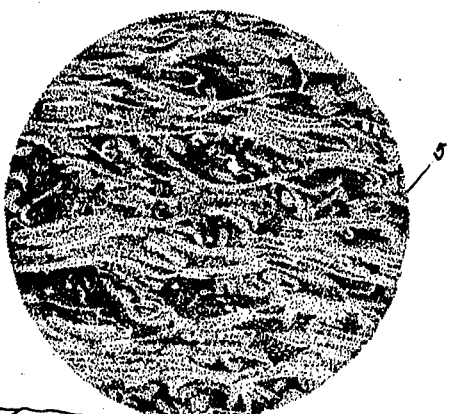
Fig.4.
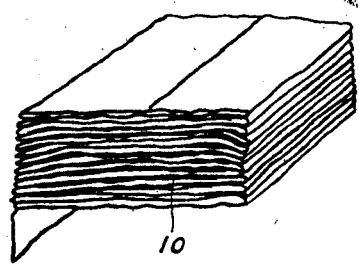
Fig.5.
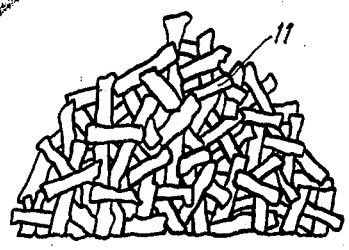
INVENTOR
William W. Cowgill
BY
ATTORNEYS Patented Sept. 11, 1934

1,973,614

UNITED STATES PATENT OFFICE 1,973,614

PECTIN

William W. Cowgill, Fairfield, Conn., assignor to Sardik Incorporated, Jersey City, N. J., a corporation of Delaware Application April 28, 1934, Serial No. 722,859

8 Claims. (Cl. 99—11)

This invention relates to pectin, and more particularly to substantially pure pectin of a form which is more desirable and effective than has heretofore been available.

Pectin is a natural constituent of a wide variety of fruits and is found in some fruits, particularly apples and citrus fruits, in such quantity that it may be economically extracted and isolated for use principally in the manufacture of jellies and jams.

Pectin is sometimes described as a vegetable glue and is understood to be a colloid of complex chemical structure existing naturally in a highly dispersed condition throughout pectin-bearing materials and capable, after recovery, concentration or isolation, of being again dispersed throughout a suitable liquid mass to form jellies and jams under proper conditions.

Pectin varies in its jellying strength and is classified as high or low grade, depending upon the quantity of pectin required to form a jelly of a mixture containing a given amount of sugar. For example, a 100 grade pectin is a pectin of such jellying power that one ounce of pectin will produce jelly in a solution containing 100 ounces of sugar under standardized conditions, or in other words, a pectin which will jelly 100 times its own weight of sugar. A pectin of half this strength would be classified as a 50 grade pectin, and a pectin of twice this strength would be classified as a 200 grade pectin, all as well known to those skilled in this art.

Heretofore, highly concentrated or pure pectin, particularly high grade pectin, has not been available in such form and condition that it may be readily dispersed at will in the domestic and commercial manufacture of jelly or the like. It is an object of this invention to provide substantially pure pectin in such form that it may be easily and effectively dispersed to accomplish the results sought to be attained by its use.

The accompanying drawing illustrates, as clearly as possible by means of line drawings, an embodiment of the present invention.

Fig. 1 is a plan view of pectin embodying the invention as it appears under a microscope having a magnifying power of 100;

Fig. 2 is a cross section or edge view on substantially the same scale as Figure 1;

Fig. 3 is an unmagnified plan view of pectin embodying the invention;

Fig. 4 is a diagrammatic view in perspective of a mass of pectin illustrating one form in which the pectin may be supplied commercially;

Fig. 5 is a similar view of a measured quantity of pectin ready for dispersion.

The only form in which dry or substantially pure pectin is available commercially is that of a powder, this powder consisting sometimes of coarse particles and sometimes of fine particles. There is a well recognized and serious problem involved in bringing about the dispersion of such pectin in a jelly forming mixture. Pectin is known as a lyo-philic or water-loving colloid. In other words, when a pectin particle is brought into contact with water it absorbs water with extreme rapidity. The absorption of water occurs on the surface of the particle, causing it to swell and at the same time form a sticky, slimy coating of hydrated pectin on the surface. This coating of hydrated pectin slows up the penetration of water into the particle to a marked degree, so that it actually protects the inside of the particle from the hydrating action of the water which is necessary for a rapid dispersion of the pectin. It follows, therefore, that when a solid mass of pectin comes in contact with water, the water will penetrate into the mass only for so long a time as is required to form a substantially impermeable surface layer of hydrated pectin. In this type of pectin such a layer is formed before the water has penetrated the entire mass so that a portion of the interior remains dry. As soon as this layer is formed, violent and continued agitation must be resorted to in order to disperse the hydrated pectin and expose to the action of the water the underlying dry pectin protected thereby.

It is, of course, practically impossible to introduce finely divided pectin powder into a liquid without bringing several particles into close proximity with each other, and this accentuates the difficulty because each particle, upon becoming partially hydrated, swells and attaches itself to adjacent particles, forming large lumps substantially impenetrable to water because of the hydrated pectin on the surface. As a result it is an exceedingly laborious and time-consuming operation to secure the proper dispersion of powdered pectin in any liquid medium, and unless pectin is thoroughly hydrated and dispersed, it obviously is not effective for its intended purpose.

It is well recognized that the difficulties of dispersing pectin are greater with high grade pectin than with pectin of a lower grade, because the higher grade pectin takes up more water upon complete hydration, and forms a greater volume of hydrated pectin which serves to prevent water from reaching the underlying dry pectin.

In order to overcome the difficulties of dispersing pectin as indicated, this invention provides dry pectin in such a form that when immersed in liquid no part of the interior of the pectin mass will be so far removed from the liquid that an impenetrable barrier of hydrated pectin can form before water has been able to penetrate throughout the entire interior of the mass.

Pectin embodying the present invention is in the form of an extremely thin film of highly attenuated structure and of indefinite length. The film is soft, diaphanous, and translucent and in its most desirable form the surface of the film is characterized by the absence of a highly lustrous or glazed appearance. Although pectin is not in any sense fibrous, nevertheless, the pectin film of this invention has somewhat the appearance of fine, soft tissue paper. In fact, the surface of the film appears to the naked eye to be characterized by a number of fine, irregular lines running more or less in the same general direction. The foregoing characteristics are illustrated as far as possible in a line drawing in Figure 3.

An examination under the microscope of pectin embodying the present invention reveals certain other characteristic features of construction, such as are illustrated more or less diagrammatically in Figures 1 and 2. When so examined, it appears that the film 5 has a high degree of porosity, there being a number of microscopic indentations or openings 7 in the surface of the film, and a number of microscopic holes 8 extending through the film, and in some cases it would appear that even though the film is exceedingly thin, nevertheless, there are pockets or bubbles 9 within the film itself, all of which are so minute that they are not readily observed except under the microscope.

The exact thickness of a film embodying this invention will depend upon a number of factors such as the grade of pectin, the porosity of the mass, the condition of the surface and the manner in which the film is to be used, but in general thicknesses between .010 and .004 inch are the most desirable. In the case of a 160 grade pectin, a thickness of .0045 will be satisfactory. As an indication of the thinness of the film embodying the invention, it may be pointed out that as now produced one gram of film, exclusive of the pores and surface irregularities, will have a surface area of about 200 to 210 square inches, or considering both faces of the film, over 400 square inches of surface per gram of film is available for contact with water upon immersion therein. There are approximately 630 square feet of film of this thickness per pound of pectin. When the pores and surface irregularities are taken into consideration, it will be appreciated that the film presents for contact with liquid a surface of even greater extent in relation to its mass. The number of square feet of film per pound will obviously vary with the thickness of the film; the thicker film above mentioned having about 270 square feet of film per pound.

Variations in the thickness of the film are, of course, permissible but the thickness together with the other characteristics of the film should always be such that the entire mass can be readily penetrated by water before a water impenetrable barrier of hydrated pectin can be formed and prevent access of water to any part of the mass. In view of the fact that a molecule of pectin of high jelly grade swells more upon hydration than a molecule of pectin of low jelly grade, the limit of thickness of the film is less with high grade pectin than with low grade.

The condition of the surface of the film is also an important element affecting the dispersibility of the film in water. The translucent appearance of the film indicates that the surface is not perfectly smooth. In pectin embodying the present invention it is advantageous to avoid imparting to the film a glazed or exceedingly smooth surface, because such a surface tends to retard the penetration of the film by water.

Preferably, the pectin is provided in the form of a continuous sheet of indeterminate length. In this form the pectin can be readily subjected to subsequent treatment for purifying, or for fixing the pH value and for other purposes, merely by drawing the film continuously through suitable baths.

At the same time, when in the form of an endless sheet or film, the material can be folded in layers 10 as indicated in Fig. 4, and when a predetermined length of film has been so folded, the mass will contain a definite predetermined quantity of pectin. It will be apparent that if a lesser quantity 11 of pectin than is contained in the folded mass is desired, such quantity can be obtained merely by cutting off a certain length of the folded mass. This feature is of considerable advantage in preparing and packaging predetermined quantities of pectin.

The laminated mass illustrated in Fig. 4 and formed by folding the film in the manner described disperses readily and without agitation when immersed in water. The speed of dispersion will be even more increased if the mass is broken into pieces of smaller size, as indicated in Fig. 4, as the individual pieces come more directly into contact with the water than when a large mass is immersed, although the laminated mass will disperse readily because of the fact that water can penetrate the individual layers of film before sufficient hydration of pectin on the surface of the film to stop water penetration can occur.

In either case, the thinness of the film, its porosity and the condition of the surface, all contribute to the dispersibility thereof and thus provide pectin in an advantageous form. Moreover, this form makes it possible to use conveniently the higher grade pectins, whereas, heretofore, the difficulty of dispersing a high grade pectin has often necessitated the lowering of the grade of pectin merely for the purpose of securing greater dispersibility.

The pectin of the present invention can be manufactured by any suitable process, although I prefer to employ the process described in my co-pending application, Serial Number 679,853, in which liquid pectin is spread in a thin continuous film over the outer surface of a rotating, interiorly heated drying cylinder, dried thereon and continuously removed therefrom in the form of an endless film having the characteristics described and illustrated. In this process, a suitable "adherence retarding agent" is incorporated in the liquid pectin prior to drying for the purpose of rendering the dry pectin film readily and easily removable from the drum by a suitable scraper and is thereafter washed out of the film by a suitable solvent. As pointed out in my said application, I have found that when liquid pectin has a suitable adherence retarding agent incorporated therein and is then spread on a suitable drying surface it may be dried thereon and then easily and completely removed therefrom by a suitable scraper or knife. These agents apparently operate to retard or temporarily minimize the inherent tendency of the pectin to adhere to the drying surface without materially impairing the effectiveness of the pectin in subsequent use. If the drying is accomplished, for example, by spreading the liquid pectin on the outer face of a rotating, interiorly heated cylinder, the dried pectin can be continuously removed in the form of a very thin, continuous sheet or film. Various agents can be used for this purpose, for example certain polyhydric alcohols, such as glycerine, and some of their derivatives; certain oils such as olive oil, lemon oil; refined mineral oil or petrolatum; suitable waxes; paraffins and sugars.

Some of these agents are readily soluble in or miscible with the pectin containing liquid, and therefore easily incorporated. Those which are not, such as some of the oils, waxes and paraffins may be easily dispersed in the pectin containing liquid in the form of an emulsion by virtue of the emulsifying power of the pectin. The waxes including those of the paraffin series, while solid at ordinary temperatures, may be melted and easily dispersed in the pectin liquid by sufficiently agitating the liquid during the addition of the melted wax.

In employing such a process to manufacture the pectin of the present invention a substantially pure liquid pectin is made from pectin-containing pomace or the like in any well known manner as by leaching, extracting and clarifying according to known methods or in any other suitable way. Having obtained liquid pectin the extract may be concentrated or not as desired, but a certain amount of concentration is preferable in order to increase the viscosity of the liquid and the ease of handling it on the drying surface. Assuming that a 4% solution is to be dried, and that glycerine has been selected as the adherence retarding agent, I add approximately 3 gallons of glycerine to each 100 gallons of the solution and agitate the mixture until it is homogeneous. The amount of glycerine is variable and if the pectin concentrate contains any appreciable amount of sugar or natural oil the amount of glycerine may be reduced. The amount of glycerine employed depends upon the concentration of the pectin rather than upon the volume of the solution. For example, 100 gallons of a 2% solution would require about 1.5 gallons of glycerine or substantially half the amount required for 100 gallons of a 4% solution.

The liquid mixture thus made is fed into direct contact with a smooth, unencumbered, heated drying surface by any suitable feeding apparatus capable of spreading the material over such surface in a thin, substantially even layer. Any suitable type of drying surface can be employed, it only being necessary that such surface be sufficiently smooth to permit the scraper passing evenly over it. It may be in the form of an interiorly heated revolving drum or cylinder the outer face of which forms the drying surface, or it may be a disc, a travelling metallic belt, or other suitably heated smooth surface.

The fluid can be applied to the surface by any suitable mechanism. For example, it may be placed in a container positioned above and out of contact with the surface of a revolving cylinder and fed thereto as the latter is revolved in order to spread the liquid evenly in a thin layer on the outer surface thereof, or it can be sprayed on such a surface. In the case of a concentrated pectin liquid the layer to be dried is preferably about .05 to .06 of an inch in thickness and it adheres to and moves with the drying cylinder, where a cylinder is employed, for a predetermined period sufficient to properly dry the film. The temperature of the drying surface, the period of drying and the thickness of the layer are so coordinated and controlled that the pectin will not be unduly heated or have its temperature raised sufficiently to cause deterioration of the pectin, but the heating operation is so controlled, both as to temperature and time, as to dry the pectin into a coherent film which will be about 10% of the applied coating or, in the example given, about .0045 of an inch thick. It will be found that such a dried film can be removed from the drying surface by a suitable scraper or knife which may be of any desired construction and arrangement capable of maintaining a constant contact across the entire extent of the drying surface during the relative movement between such surface and the scraper. The contact must be sufficiently close to remove all material so that the surface is left perfectly clean. At the same time the scraper must be of such construction that it will pass smoothly over the surface without cutting into it. A flexible steel blade, the edge of which is pressed against the drying surface with sufficient pressure to provide the necessary contact across the entire surface, has proved to be entirely satisfactory.

The material is removed by the blade in the form of a film or very thin sheet having the structural characteristics of the present invention, and in its removal the material acquires a wavy surface. The film thus formed may be collected in any suitable receptacle as it moves in a continuous manner over the blade.

The extraneous material, such as the glycerine together with any impurities which may have been allowed to remain until this stage of the process, can be removed by passing the pectin film through a solvent such, for example, as alcohol which is capable of dissolving out the glycerine and dissolving or washing out other impurities from the film without affecting the pectin itself. Any solvent which may remain in the film itself can be removed by passing the film over a flat surface warmed sufficiently to vaporize such solvent as may be left in the film, or it may be passed through an air drier or any preferred form of drying mechanism.

The degree of porosity and the character of the surface of pectin produced in film form according to the process described in my co-pending application depends to some extent upon the character of the drying surface. I have found that an ordinarily smooth surface is to be preferred to a highly polished surface and, therefore, if the form of pectin embodying this invention and having the highest degree of dispersibility is desired, the use of a highly polished drying cylinder is to be avoided.

From the foregoing it will readily be understood that when a small particle or even a large mass of pectin in the form provided by this invention is introduced into a liquid, there will be an immediate wetting of the entire surface of the pectin, and such a complete and immediate penetration of the interior of the mass by the water that no part of the pectin can be effectively shut off from the liquid by an impenetrable barrier of hydrated pectin. Thus the pectin in its entirety becomes hydrated in a very short space of time, a matter of seconds or even fractions of a second, and inasmuch as there is an abundance of water available the concentration of the hydrated pectin is not so high as to prevent easy dispersion by slight agitation, such as stirring, which will result in complete dispersion of the pectin throughout the liquid with which it is intended to be used.

I claim:

1. A coherent porous film of substantially dry pectin, said film having such structure that it will become completely hydrated and readily dispersed in water without forming clumps or agglomerated particles such as characterize the dispersing of powdered pectin.

2. A thin coherent porous film of substantially dry pectin, said film having such an attenuated structure that when immersed in water the water has immediate access to all portions of the mass so that it will become completely hydrated and readily dispersed without forming clumps or agglomerated particles such as characterize the dispersing of powdered pectin.

3. Substantially dry pectin of uniform dispersibility and in the form of a coherent porous film characterized by this that the film is of such thin and attenuated structure that when immersed in water the water has substantially immediate access to all portions of the mass so that the mass will become completely hydrated and readily dispersed in water without forming clumps or agglomerated particles such as characterize the dispersing of powdered pectin.

4. A coherent film of substantially dry pectin made from a liquid dispersion, having a jelly grade substantially equal to the jelly grade of the dispersed pectin and of such form that when immersed in water the water has immediate access to all portions of the mass and no portion of the pectin can form a sufficient thickness of hydrated pectin to prevent the penetration of water to and hydration of the underlying pectin.

5. An article of manufacture comprising a coherent film of substantially dry pectin having not less than 270 square feet of film per pound and of such form that when immersed in water the water has immediate access to all portions of the mass and no portion of the pectin can form a sufficient thickness of hydrated pectin to prevent the penetration of water to and hydration of the underlying pectin.

6. An article of manufacture comprising a coherent film of substantially dry pectin having approximately 600 square feet of film per pound and of such form that when immersed in water the water has immediate access to all portions of the mass and no portion of the pectin can form a sufficient thickness of hydrated pectin to prevent penetration of water to and hydration of the underlying pectin.

7. An article of manufacture comprising a coherent film of substantially dry pectin having an extended superficial area and an average thickness not greater than .010 inch, and of such form that when immersed in water the water has immediate access to all portions of the mass and no portion of the pectin can form a sufficient thickness of hydrated pectin to prevent penetration of water to and hydration of the underlying pectin.

8. An article of manufacture comprising a coherent film of substantially dry pectin having an extended superficial area and an average thickness of approximately .0045 inch, and of such form that when immersed in water the water has immediate access to all portions of the mass and no portion of the pectin can form a sufficient thickness of hydrated pectin to prevent the penetration of water to and hydration of the underlying pectin.

WILLIAM W. COWGILL.